United States Patent
Cook et al.

(10) Patent No.: US 10,929,406 B2
(45) Date of Patent: Feb. 23, 2021

(54) SYSTEMS AND METHODS FOR A SELF-SERVICES DATA FILE CONFIGURATION WITH VARIOUS DATA SOURCES

(71) Applicant: AMERICAN EXPRESS TRAVEL RELATED SERVICES COMPANY, INC., New York, NY (US)

(72) Inventors: Jane Cook, Mountain Lakes, NJ (US); Sachin Jadhav, Phoenix, AZ (US); Yogaraj Jayaprakasam, Phoenix, AZ (US); Deepak Narayanan, Phoenix, AZ (US); Rahul Shaurya, Phoenix, AZ (US)

(73) Assignee: American Express Travel Related Services Company, Inc, New York, NY (US)

( * ) Notice: Subject to any disclaimer, the term of this patent is extended or adjusted under 35 U.S.C. 154(b) by 846 days.

(21) Appl. No.: 15/335,831

(22) Filed: Oct. 27, 2016

(65) Prior Publication Data
US 2018/0121519 A1  May 3, 2018

(51) Int. Cl.
*G06F 16/2457* (2019.01)
*G06F 16/182* (2019.01)
*G06F 16/21* (2019.01)
*G06F 16/22* (2019.01)
*G06F 16/2458* (2019.01)

(52) U.S. Cl.
CPC ........ *G06F 16/2457* (2019.01); *G06F 16/182* (2019.01); *G06F 16/211* (2019.01); *G06F 16/221* (2019.01); *G06F 16/2282* (2019.01); *G06F 16/2471* (2019.01)

(58) Field of Classification Search
CPC .................................................... G06F 16/2457
USPC .......................................................... 707/809
See application file for complete search history.

(56) References Cited

U.S. PATENT DOCUMENTS

| | | | | |
|---|---|---|---|---|
| 10,489,355 B1* | 11/2019 | Messmer et al. | ....... | G06F 16/21 |
| 2010/0036831 A1* | 2/2010 | Vemuri et al. | .......... | G06F 17/30 |
| | | | | 707/707 |
| 2015/0356123 A1* | 12/2015 | Gorelik | ................... | G06F 17/30 |
| | | | | 707/807 |
| 2016/0092484 A1* | 3/2016 | Finkler | ................... | G06F 17/30 |
| | | | | 707/715 |

* cited by examiner

*Primary Examiner* — Muluemebet Gurmu
(74) *Attorney, Agent, or Firm* — Thomas | Horstemeyer LLP

(57) ABSTRACT

A system for generating and delivering custom data sets in a big data environment may receive a preselected schema that identifies a plurality of columns from a plurality of data sources for inclusion in an output data file. The system reads data from the data sources to generate a data file containing a big data table. The system monitors the plurality of data sources to detect that the data sources have been ingested into a data storage system. The data file is read and a column is filtered from the data file to generate the output data file in response to the preselected schema excluding the column. The output data file is transferred to a client device.

19 Claims, 8 Drawing Sheets

SYSTEMS AND METHODS FOR A SELF-SERVICES DATA FILE CONFIGURATION WITH VARIOUS DATA SOURCES

FIELD

This disclosure relates to systems and methods for a customized data file configuration for data files from various sources.

BACKGROUND

Large data sets may exist in various levels of size and organization. With big data comprising data sets as large as ever, the volume of data collected incident to the increased popularity of online and electronic transactions continues to grow. Billions of rows and hundreds of thousands of columns worth of data may populate a single table, for example. Different users may desire to access different portions of the large volume of data populating the table. However, different portions of the table may have different security restrictions. For instance, some portions may contain personally identifiable information that should have higher security. Moreover, portions of the table and/or the entire table may be encrypted at rest. Different users may also have different permissions specific to their roles, identities, and the row and/or column of the table.

Extracting data files from big data sets typically uses tremendous processing power. The processing power may restrict the frequency and speed at which data files can be extracted from the big data sets. As a result, the processing cost to extract and transfer multiple custom data sets having multiple different structures may be prohibitive.

SUMMARY

A system, method, and computer readable medium (collectively, the "system") is disclosed for generating and delivering custom data sets in a big data environment. The system receives a preselected schema that identifies a plurality of columns from a plurality of data sources for inclusion in an output data file. The system reads data from the data sources to generate a data file containing a big data table. The system monitors the plurality of data sources to detect that the data sources have been ingested into a data storage system. The data file is read and a column is filtered from the data file to generate the output data file in response to the preselected schema excluding the column. The output data file may also be transferred to a client device.

In various embodiments, reading data from the data sources may include extracting data from the data storage system, staging the data in a staging table, running a preprocessing script on the staging table to generate the data file, and storing the data file in a use case folder. The system may listen to a messaging queue to detect a maximum timestamp of the data file, and compare the maximum timestamp to a timestamp of a trigger in a trigger table to determine a data source associated with the trigger has been ingested into the data storage system. A data readiness check may be completed to determine that each of the data sources has been ingested more recently than the maximum timestamp. Reading the data file and filtering the data may occur in response to the data readiness check. The output data file may be transferred to the client device over a secure file transfer channel. Reading the data file may also comprise executing a first query against the data file to generate a first schema, and registering the first schema in a temporary table. The system may create a formatted and ordered string containing content in response to the reading the data file. The system may also write the output data file to a distributed file system.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure provides systems, methods, and computer program products for customizing data feeds for individual accounts and delivering customized data files to client devices. The custom data feeds may be extracted from big data environments for secure delivery to remote client devices, as described in detail below.

Figure 1:
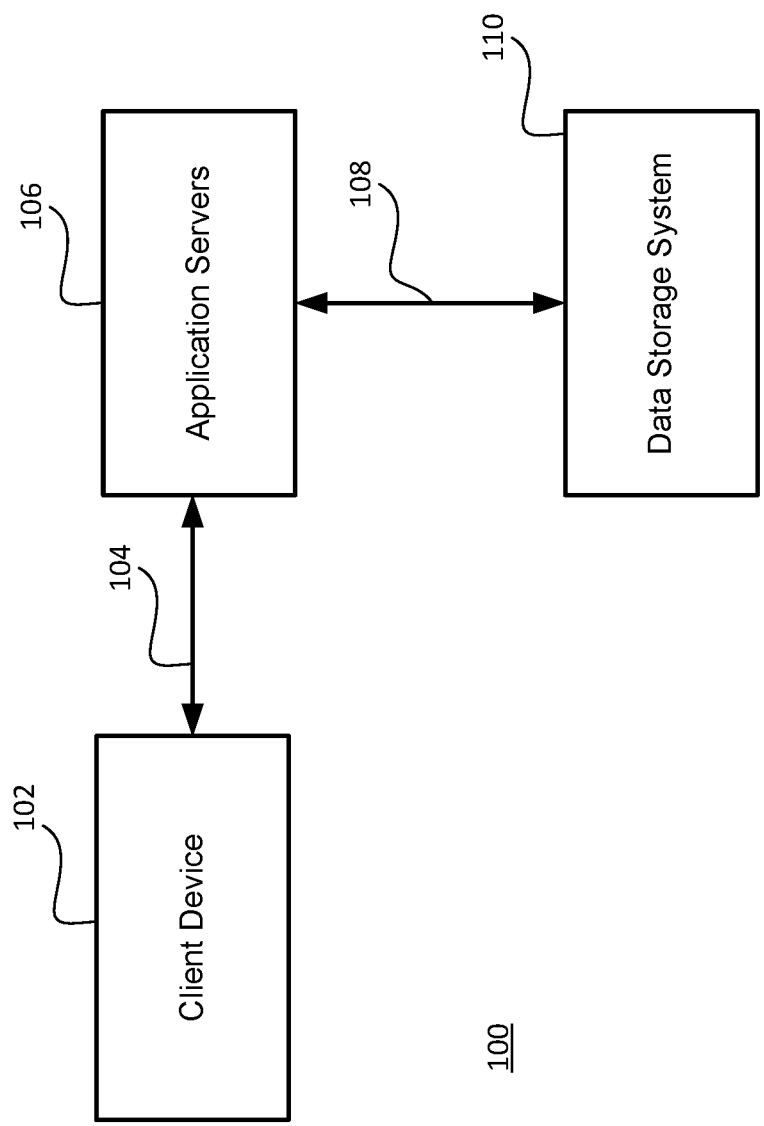
FIG. 1 illustrates an exemplary system for providing customized data compilation and retrieval services, in accordance with various embodiments.

Referring now to FIG. 1, a data extraction system 100 for monitoring data access behavior is shown, in accordance with various embodiments. Data extraction system 100 may include various devices, modules, and/or applications in communication with a data storage system 110 over a network 104. The various devices, modules and applications may include client device 102, application servers 106, and/or other computing devices in communication with application servers 106 to configure and retrieve customized data feeds.

The client device 102, application servers 106, and/or other computing devices may include a computer or processor, or a set of computers/processors, such as a personal computer. However, other types of computing units or systems may be used, including laptops, notebooks, hand held computers, personal digital assistants, cellular phones, smart phones (e.g., iPhone®, BlackBerry®, Android®, etc.) tablets, wearables, Internet of Things (IoT) devices, or any other device capable of sending and/or receiving data over the network 104. Application servers 106 may include one or more computing devices and/or virtual machines providing load balancing, application services, web services, data query services, data transfer services, reverse proxy services, or otherwise facilitating the customization and delivery of customized data feeds from data storage system 110.

Network 104 and/or network 108 may be any suitable electronic link capable of carrying communication between two or more computing devices. For example, network 104 may be local area network using TCP/IP communication or wide area network using communication over the Internet. Network 104 may also be an internal network isolated from the Internet. Application servers 106 may be in communication with data storage system 110 over network 108. For example, application servers 106 may communicate across the Internet with client device 102, and application servers 106 may communicate with data storage system 110 across a private LAN isolated from the Internet by a firewall and/or other security measures.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

Application servers 106 may interact with a web application or local application running on client device 102. A user operating client device 102 may interact with a user interface to generate a schema that defines the structure and content of an output data file. For example, the user interface may allow a user to select desired columns from the desired data sources to generate one or more output data files containing the corresponding records. Application servers 106 may store the schema in JavaScript Object Notation (JSON) or Extensible Markup Language (XML), for example, for application during data file generation, as described in greater detail herein. For example, a user has access to a first file source having 100 rows, from which they select the first 10 for their preselected schema. The same user has access to a second data file, from which they select 15 rows for their preselected schema. The preselected schema includes the first 10 rows of the first file and the 15 rows from the second file as defined in the second file. An output file may be generated by filtering out columns that are not present in the preselected schema, as described in greater detail herein.

In various embodiments, data storage system 110 may be also be a computing device or system of computing devices similar to or the same as those described above configured to support data writing, customization, and retrieval. For example, data storage system 110 may be a big data system as described below with reference to FIGS. 2 and 3. Data storage system 110 may comprise computing devices and applications to generate data access models for users, as described below. Data storage system 110 may respond to file request (e.g., read and write) received from client device 102, application servers 106, and/or other computing devices.

Figure 2:
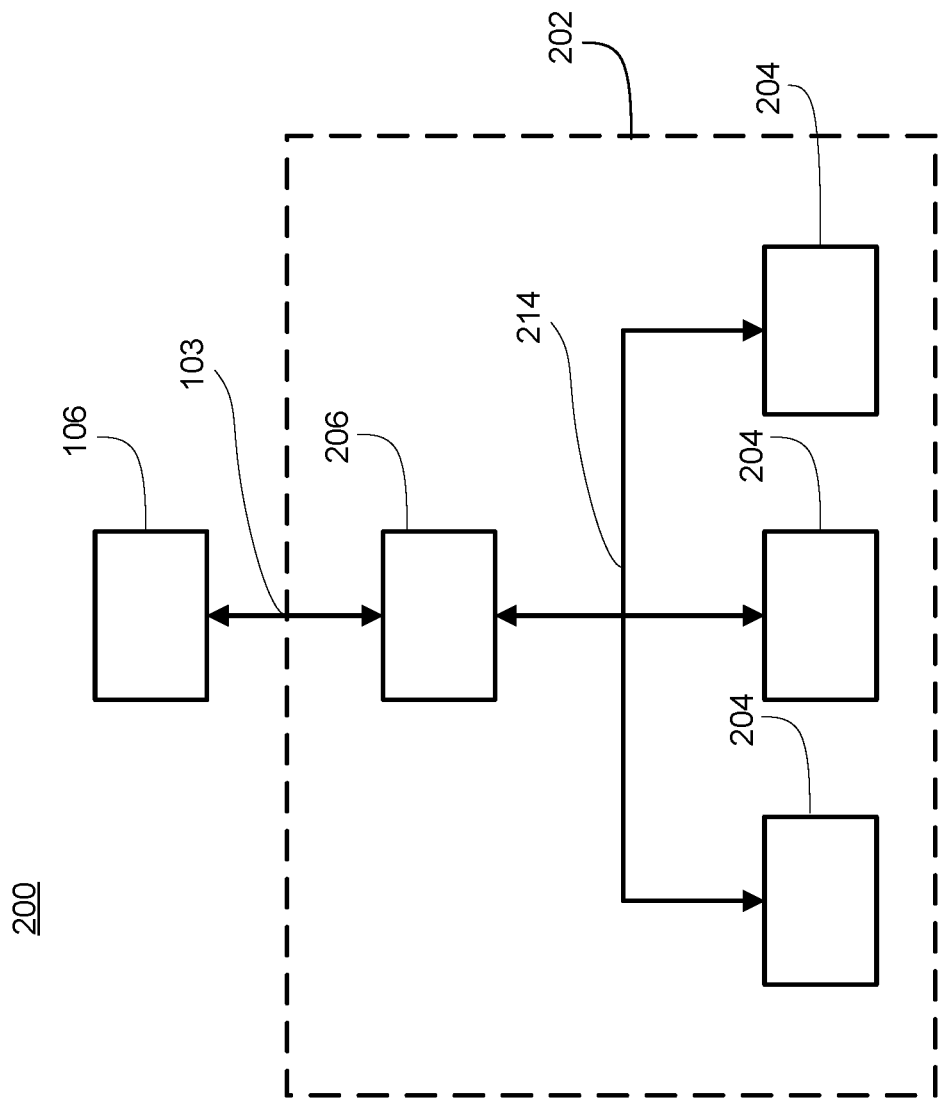
FIG. 2 illustrates an exemplary distributed file system comprising multiple computing devices for data storage and processing, in accordance with various embodiments.

With reference to FIG. 2, data storage system 110 may be a distributed file system (DFS) 200, in accordance with various embodiments. DFS 200 comprises a distributed computing cluster 202 configured for parallel processing and/or storage. Distributed computing cluster 202 may comprise a plurality of nodes 204 in electronic communication with each of the other nodes, as well as a control node 206. Processing tasks may be apportioned among the nodes of distributed computing cluster 202 to improve throughput and enhance storage capacity. Distributed computing cluster may be, for example, a Hadoop® cluster configured to process and store big data sets with some of nodes 204 comprising a distributed storage system and some of nodes 204 comprising a distributed processing system. In that regard, distributed computing cluster 202 may be configured to support a Hadoop® distributed file system (HDFS) as specified by the Apache Software Foundation at http://hadoop.apache.org/docs/.

In various embodiments, nodes 204, control node 206, and application servers 106 may comprise any devices capable of receiving and/or processing an electronic message via network 104 and/or network 214. For example, nodes 204 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, application servers 106 may submit requests to control node 206. Control node 206 may distribute the tasks among nodes 204 for processing to complete the job intelligently. Control node 206 may limit network traffic and enhance the speed at which incoming data is processed. In that regard, application servers 106 may be a separate machine from distributed computing cluster 202 in electronic communication with distributed computing cluster 202 via network 104. Nodes 204 and control node 206 may similarly be in communication with one another over network 214. Network 214 may be an internal network isolated from the Internet and application servers 106, or, network 214 may comprise an external connection to enable direct electronic communication with application servers 106 and the Internet.

In various embodiments, DFS 200 may process hundreds of thousands of records from a single data source. DFS 200 may also ingest data from hundreds of data sources. Nodes 204 may process the data in parallel to expedite the processing. Furthermore, the transformation and intake of data as disclosed herein may be carried out in memory on nodes 204. For example, in response to receiving a source data file of 100,000 records, a system with 100 nodes 204 may distribute the task of processing 1,000 records to each node 204. Each node 204 may then process the stream of 1,000 records while maintaining the resultant data in memory until the batch is complete for batch processing jobs. The results may be written, augmented, logged, and written to disk for subsequent retrieval. The results may be written to disks using various big data storage formats.

Figure 3:
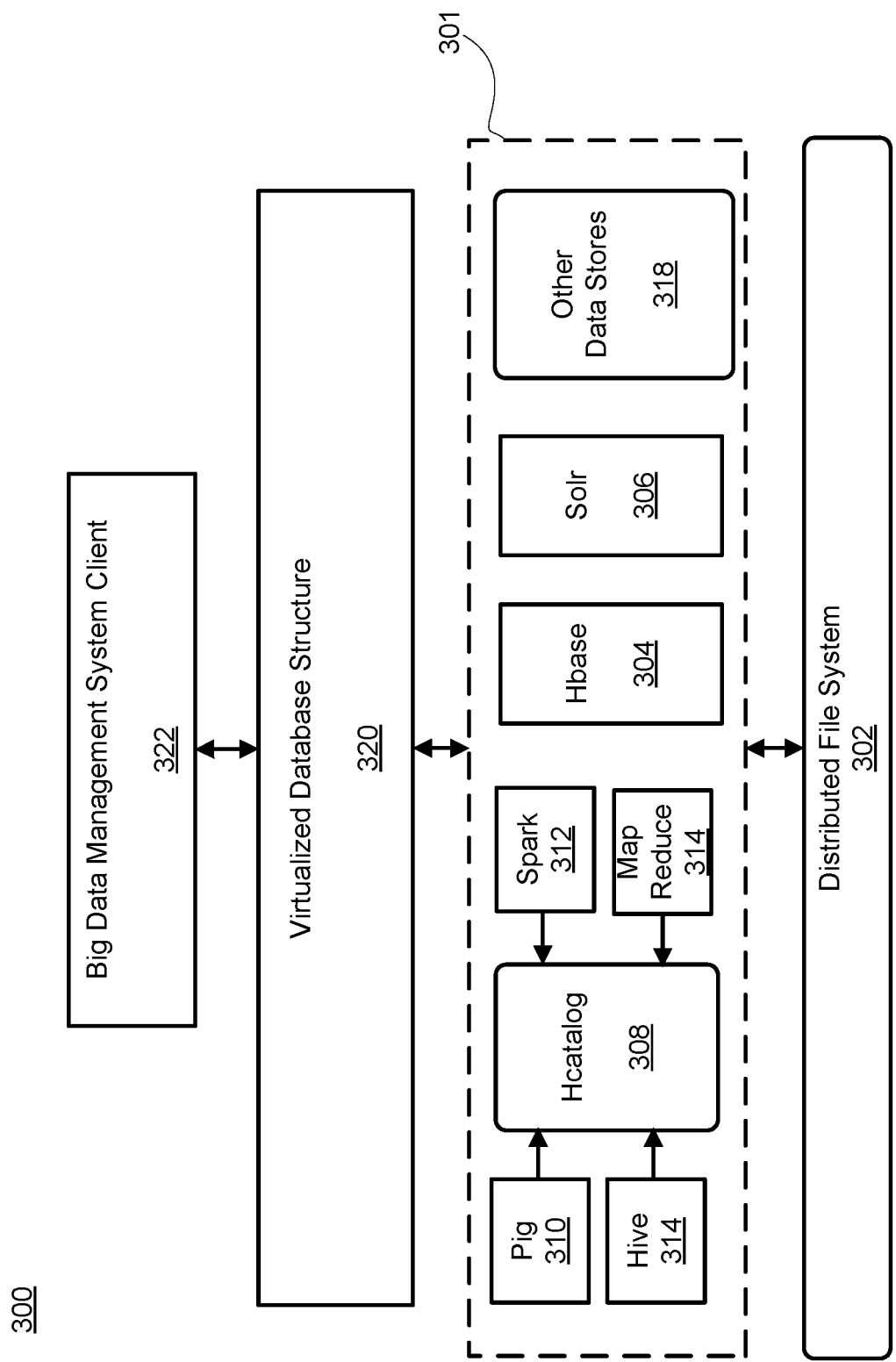
FIG. 3 illustrates an exemplary big data environment to support customized data compilation and retrieval services, in accordance with various embodiments.

With reference to FIG. 3, an exemplary architecture of a big data management system (BDMS) 300 is shown, in accordance with various embodiments. BDMS 300 may be similar to or identical to DFS 200 of FIG. 2, for example. DFS 302 may serve as the physical storage medium for the various data storage formats 301 of DFS 302. A non-relational database 304 may be maintained on DFS 302. For example, non-relational database 304 may comprise an HBase storage format that provides random, real time read and/or write access to data, as described and made available by the Apache Software Foundation at http://hbase.apache.org/.

In various embodiments, a search platform 306 may be maintained on DFS 302. Search platform 306 may provide distributed indexing and load balancing to support fast and reliable search results. For example, search platform 306 may comprise a Solr® search platform as described and made available by the Apache Software Foundation at http://lucene.apache.org/solr/.

In various embodiments, a data warehouse 314 such as Hive® may be maintained on DFS 302. The data warehouse 314 may support data summarization, query, and analysis of warehoused data. For example, data warehouse 314 may be a Hive® data warehouse built on Hadoop® infrastructure. A data analysis framework 310 may also be built on DFS 302 to provide data analysis tools on the distributed system. Data analysis framework 310 may include an analysis runtime environment and an interface syntax similar to those offered in the Pig platform as described and made available by the Apache Software Foundation at https://pig.apache.org/.

In various embodiments, a cluster computing engine 312 for high-speed, large-scale data processing may also be built on DFS 302. For example, cluster computing engine 312 may comprise an Apache Spark™ computing framework running on DFS 302. DFS 302 may further support a MapReduce layer 316 for processing big data sets in a parallel, distributed manner to produce records for data storage formats 301. For example, MapReduce layer 316 may be a Hadoop® MapReduce framework distributed with the Hadoop® HDFS as specified by the Apache Software Foundation at http://hadoop.apache.org/docs/. The cluster computing engine 312 and MapReduce layer 316 may ingest data for processing, transformation, and storage in data storage formats 301 using the distributed processing and storage capabilities of DFS 302.

In various embodiments, DFS 302 may also support a table and storage management layer 308 such as, for example, an HCatalog installation. Table and storage management layer 308 may provide an interface for reading and writing data for multiple related storage formats. Continuing with the above example, an HCatalog installation may provide an interface for one or more of the interrelated technologies described herein such as, for example, Hive®, Pig, Spark®, and Hadoop® MapReduce.

In various embodiments, DFS 302 may also include various other data storage formats 318. Other data storage formats 318 may have various interface languages with varying syntax to read and/or write data. In fact, each of the above disclosed storage formats may vary in query syntax and interface techniques. Virtualized database structure 320 may provide a uniform, integrated user experience by offering users a single interface point for the various different data storage formats 301 maintained on DFS 302. Virtualized database structure 320 may be a software and/or hardware layer that makes the underlying data storage formats 301 transparent to client 322 by providing variables on request. Client 322 may request and access data by requesting variables from virtualized database structure 320. Virtualized database structure 320 may then access the variables using the various interfaces of the various data storage formats 301 and return the variables to client 322.

In various embodiments, the data stored using various of the disclosed data storage formats 301 may be stored across data storage formats 301 and accessed at a single point through virtualized database structure 320. The variables accessible through virtualized database structure 320 may be similar to a column in a table of a traditional RDBMS. That is, the variables identify data fields available in the various data storage formats 301.

In various embodiments, variables may be stored in a single one of the data storage formats 301 or replicated across numerous data storage formats 301 to support different access characteristics. Virtualized database structure 320 may comprise a catalog of the various variables available in the various data storage formats 301. The cataloged variables enable BDMS 300 to identify and locate variables stored across different data storage formats 301 on DFS 302. Variables may be stored in at least one storage format on DFS 302 and may be replicated to multiple storage formats on DFS 302. The catalog of virtualized database structure 320 may track the location of a variable available in multiple storage formats.

The variables may be cataloged as they are ingested and stored using data storage formats 301. The catalog may track the location of variables by identifying the storage format, the table, and/or the variable name for each variable available through virtualized database structure 320. The catalog may also include metadata describing what the variables are and where the variables came from such as data type, original source variables, timestamp, access restrictions, sensitivity of the data, and/or other descriptive metadata. For example, internal data and/or PII may be flagged as sensitive data subject to access restrictions by metadata corresponding to the variable containing the internal data and/or PII. Metadata may be copied from the storage formats 301 or generated separately for virtualized database structure 320.

In various embodiments, virtualized database structure 320 may provide a single, unified, and virtualized data storage format that catalogues accessible variables and provides a single access point for records stored on data storage formats 301. Client 322 (which may operate using similar hardware and software to client 210 of FIG. 1) may access data stored in various data storage formats 301 via the virtualized database structure 320. In that regard, virtualized database structure 320 may be a single access point for data stored across the various data storage formats 301 on DFS 302.

In various embodiments, virtualized database structure 320 may store and maintain the catalog of variables including locations and descriptive metadata, but virtualized database structure 320 may not store the actual data contained in each variable. The data that fills the variables may be stored on DFS 302 using data storage formats 301. Virtualized database structure 320 may enable read and write access to the data stored in data storage formats 301 without a client system having knowledge of the underlying data storage formats 301.

Referring now to FIGS. 4-7, an exemplary system 400 is shown for customizing data feeds and retrieving data in response to requests by individual client devices 102, in accordance with various embodiments. System 400 comprises a data extractor 402, a scheduling and event manager (SEM) 502, and a data file composer 602 in communication with a big data system for processing requests for customized data files from a data storage system 110.

Figure 4:
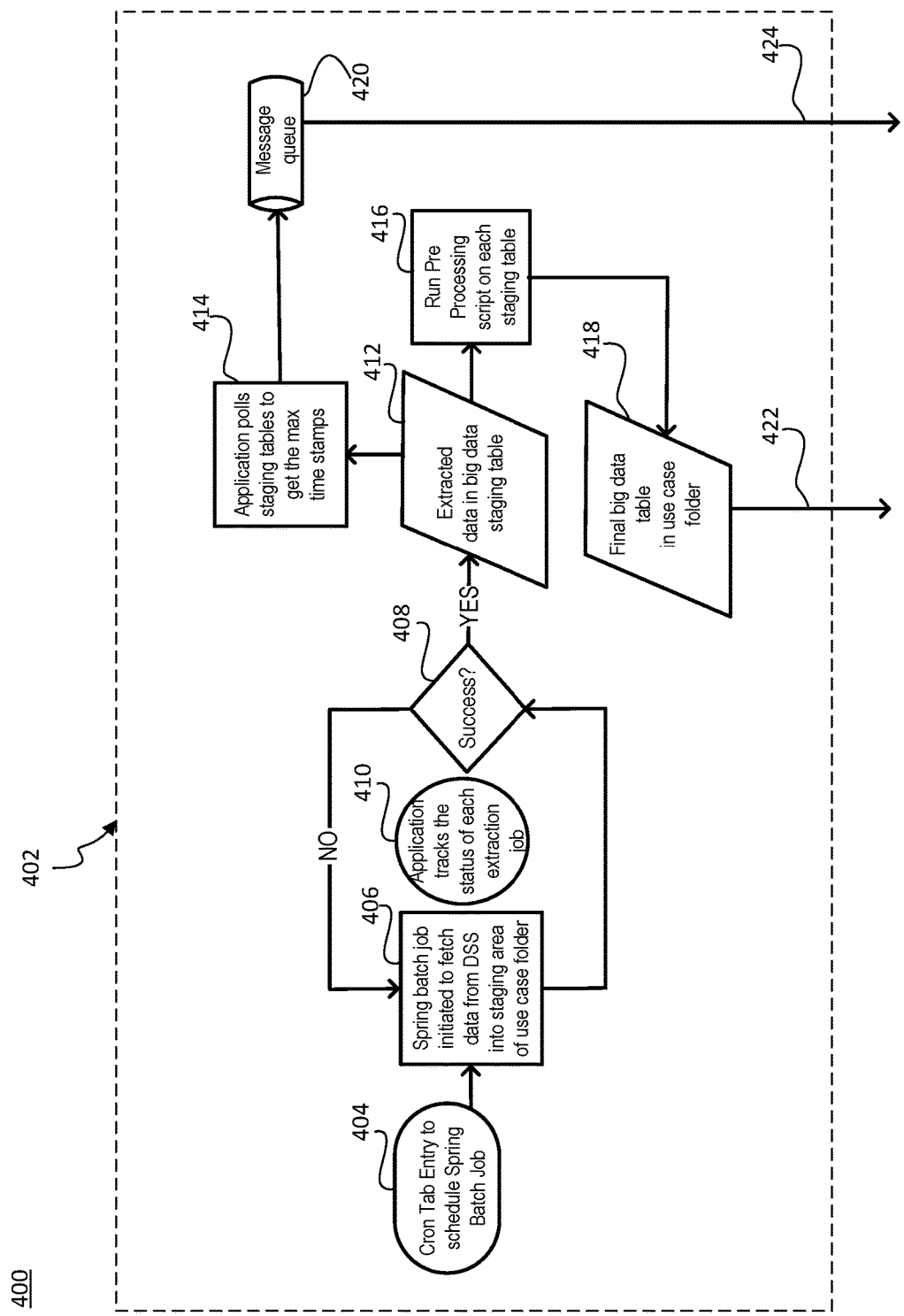
FIG. 4 illustrates an exemplary data extractor component of a system for providing customized data compilation and retrieval services, in accordance with various embodiments.

With reference to FIG. 4, data extractor 402 may run on application servers 106 and/or data storage systems 110. Data extractor 402 may be configured to run at set intervals or otherwise set to run at predetermined times by creating cron jobs for data extractor 402 to run (Block 404). Cron jobs may include entries to schedule execution of batch data processing commands. For example, a cron job may be scheduled to execute a spring batch process using spring batch software, as documented at http://projects.spring.io/spring-batch/ and made available by Pivotal Software, Inc. Although spring batch is one exemplary batch processing tool, other batch processing tools may be used.

The cron job may initiate a data extraction job to fetch data from data storage system 110 into a staging table (Block 406). The staging table may be in a big data format as served by data storage system 110. The data extraction job may run incrementally to reduce the amount of processing and data extraction work to prepare the staging table. The term incrementally is used above to describe a data extraction job that extracts only data that is new or has changed since the last time the data extraction job ran. Data extractor 402 may check whether the data fetch process was successful (Block 408). If not, data extractor 402 may continue running the data extraction job and/or rerun the data extraction job. An application may track the status of the data extraction job for reporting via SMS, MMS, email, web application, and/or application dashboard. In response to the data extraction job successfully extracting the data, data extractor 402 may stage the extracted data in a staging table (Block 412). The staging table may be a big data table supported by data storage system 110 such as, for example, a Hive table stored permanently or temporarily on data storage system 110.

In various embodiments, data extractor 402 may poll staging tables for the maximum timestamp for a record extracted from data storage system 110 by the data extraction job and stored in the staging table (Block 414). The max timestamp may indicate the last time an entry was updated by the data extraction job and may be used in future execution of the data extraction job to compare to existing timestamps and extract records with an update time greater than (or equal) the previously max timestamp returned in response to the previous poll. The timestamp may be placed in a messaging queue 420 for communication to SEM 502 and serve as output 424 from data extractor 402. For example, one or more solace queues may be used as messaging queues in system 400.

In various embodiments, data extractor 402 may run a pre-processing script on the staging tables (Block 416). Preprocessing scripts may include data formatting commands for the staging table. For example, the preprocessing script may format staging tables in a condition similar to a relational database table by applying keys to the records. The preprocessing may prepare staging tables into the desired output format. In that regard, the preprocessing logic of a preprocessing script may uniquely define the data set to be output from the staging table. The final big data tables may then be placed in a use case folder (Block 418) and passed to SEM 502 as output 422.

Figure 5:
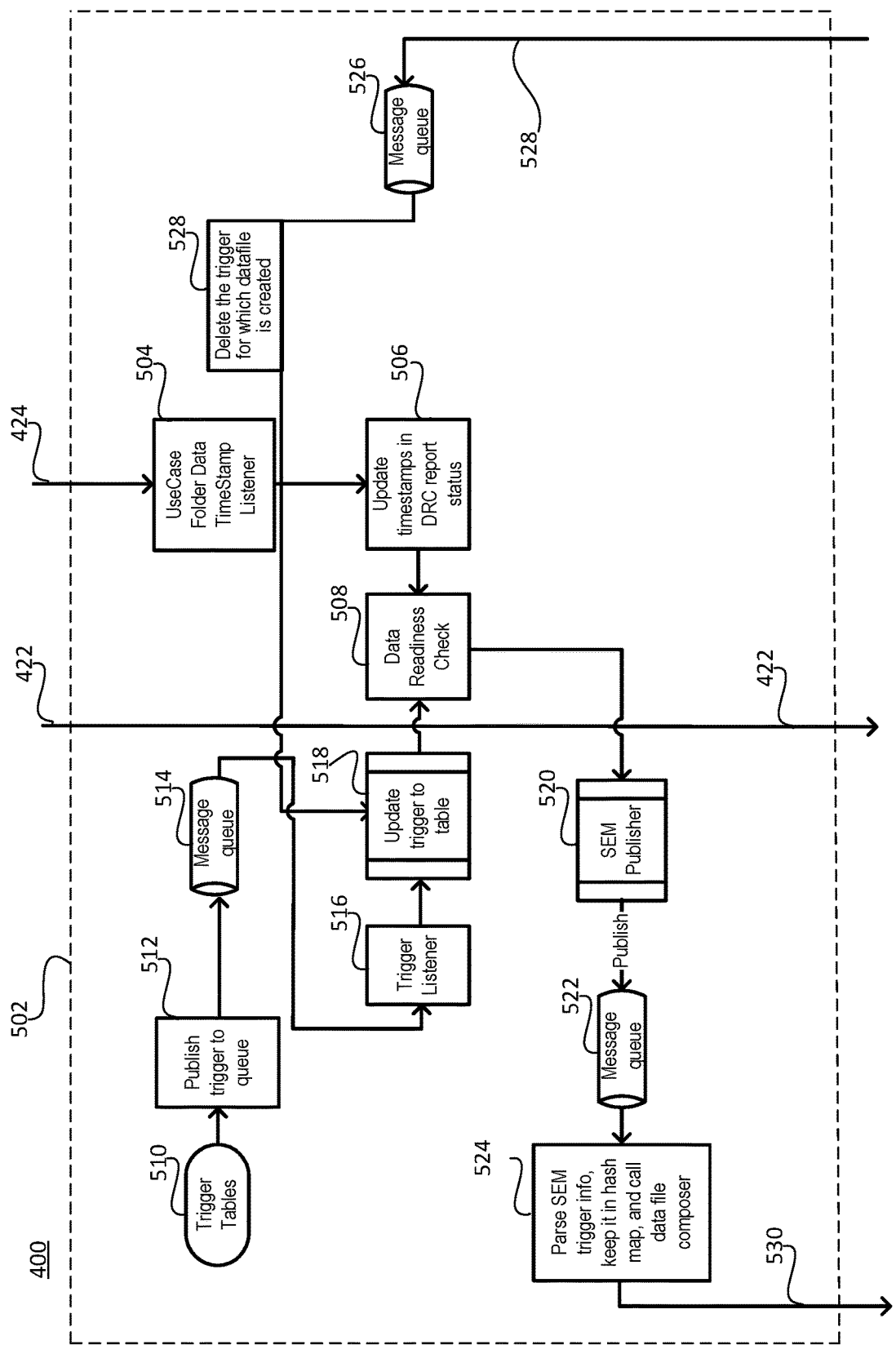
FIG. 5 illustrates an exemplary scheduling and event manager (SEM) component of a system for providing customized data compilation and retrieval services, in accordance with various embodiments.

With reference to FIG. 5, SEM 502 of system 400 is shown for scheduling and managing data file generation, in accordance with various embodiments. SEM 502 may ensure that each of the data streams used to generate an output file have been ingested into data storage system 110 prior to generation of the output file. SEM 502 may run on application servers 106 and/or data storage systems 110. SEM 502 may be in communication with data extractor 402 to schedule and manage operations. SEM 502 may include a listener configured to detect output 424 that includes the timestamps from data extractor 402 (Block 504). SEM 502 may update the timestamps for a data-readiness check (DRC) and report timestamp status as updated. The timestamps may be updated by writing the new timestamps in a known location or otherwise preparing the timestamps for a DRC, for example. SEM 502 may report the status by setting a flag or triggering the DRC, for example.

In various embodiments, DRC may be executed to determine that the data in data storage system 110 is ready for preparation of a data file. SEM 502 may also use trigger tables 510 to trigger the DRC. SEM 502 may publish a timestamp as to a messaging queue 514 to act as a trigger indicating the time at which a data source was ingested (Block 512). A setup and scheduling utility may tracks the data readiness into data warehouse and data file configurations top coordinate data file creation and record triggers in trigger tables 510. The message may trigger a listener (Block 516) running on data storage system 110 and monitoring the messaging queue 514. In response to detecting a message in messaging queue 514, SEM 502 may update the trigger tables to include the timestamp from messaging queue 514. The update to the trigger tables may include update a file containing a list of timestamps. The DRC may hold the preparation of a data file until the triggers listed in the file have come in and the file is ready for processing. The data file may be MapR tables such as, for example, an M7 table as documented at http://doc.mapr.com/display/MapR3.

In various embodiments, the DRC 508 may compare the timestamps from the trigger table to the timestamps in the DRC report to determine whether the data to be used to generate a data file has been ingested. In response to the timestamps in the trigger table being greater than (or equal to) the timestamps in the DRC, SEM publisher 520 may send a message into messaging queue 522. A data file composer listener may parse the SEM trigger from messaging queue 522, store the trigger info in a hash map, and call the data file composer 602 of FIGS. 6A and 6B to generate a data file (Block 524). The SEM trigger may include the preselected data schema in a JSON or XML format, for example, as described above. The SEM trigger may also include user data such as output file name, output file location, time stamp ranges for the output file, or other metadata for generating the file site.

Figure 6A:
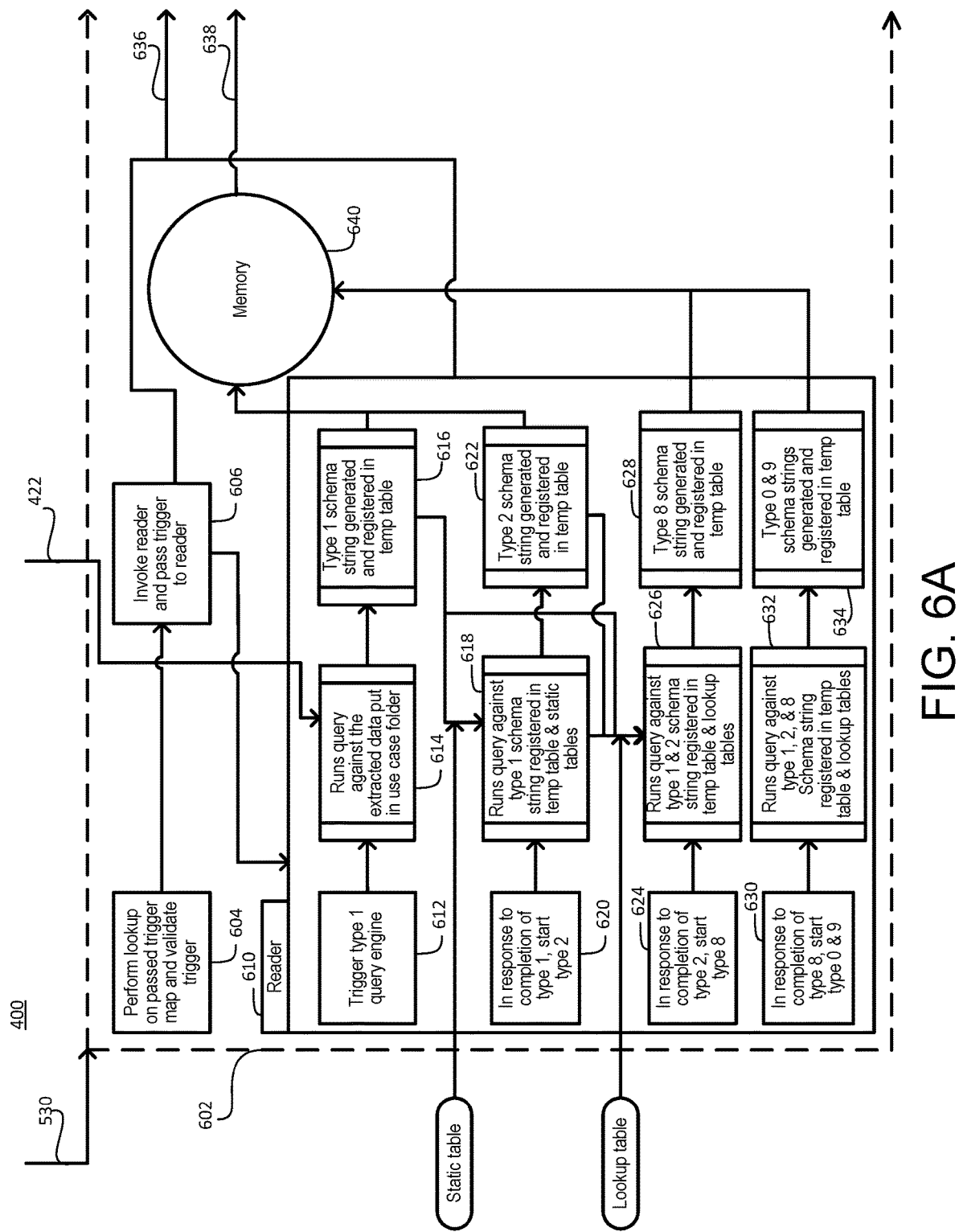
FIGS. 6A and 6B illustrate an exemplary data-file composer component of a system for providing customized data compilation and retrieval services, in accordance with various embodiments.
Figure 6B:
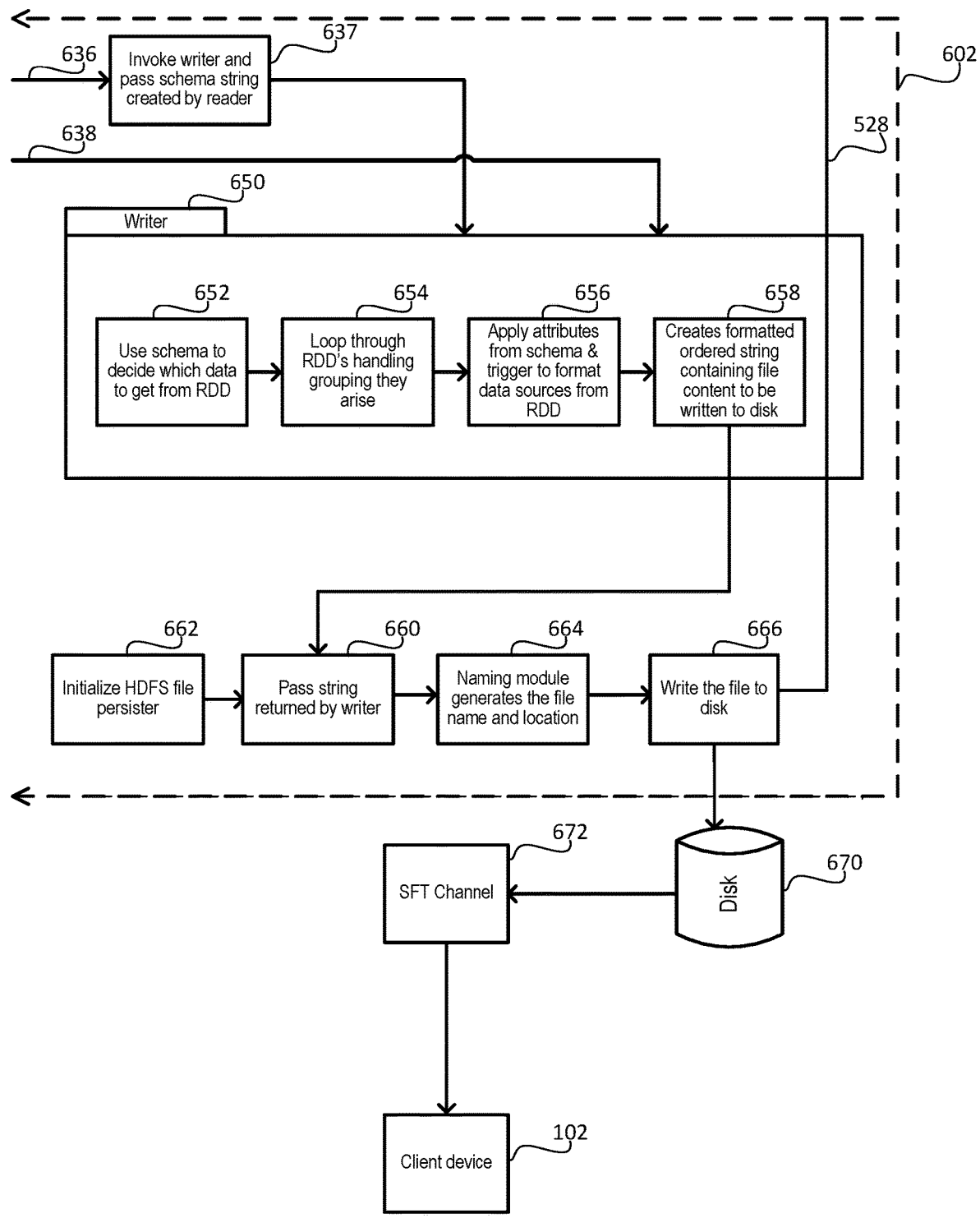
Figure 7:
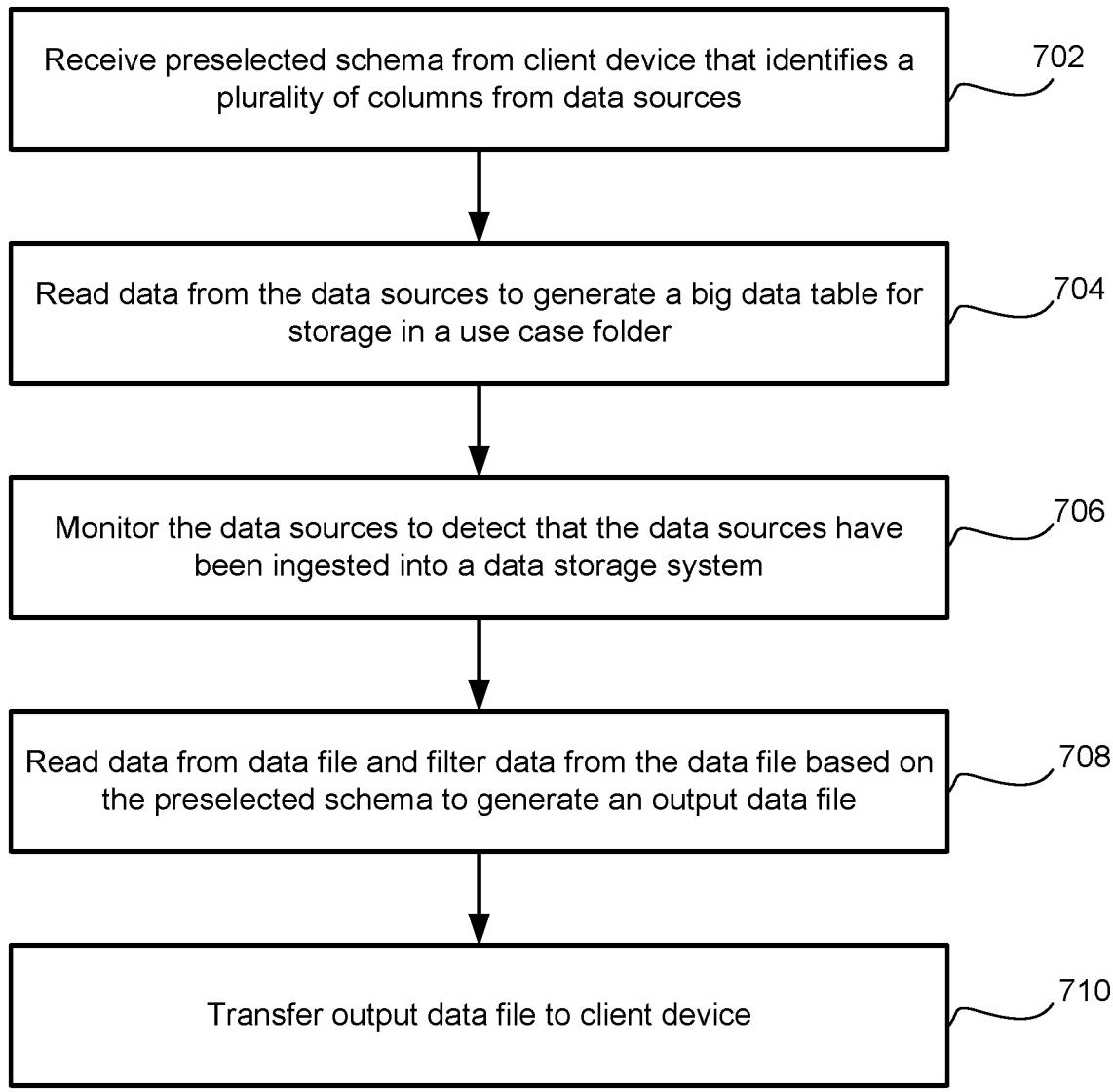
FIG. 7 illustrates a process for generating and distributing a custom data file based on a preselected schema, in accordance with various embodiments.

Referring now to FIGS. 6A and 6B, data file composer 602 may generate custom data files for transmission to client device 102. Data file composer 602 may generate data files by retrieving a super set of data and applying a preselected schema to the super set to filter unselected data and generate the output file.

In various embodiments, data file composer 602 may include a reader 610 and a writer 650. Reader 610 may retrieve data from data storage system 110 corresponding to various data sources to which a user of client device 102 has access. Prior to invoking reader 610, data file composer 602 may perform a lookup on passed SEM triggers and validate the SEM triggers (Block 604). Data file composer 602 may invoke reader 610 and pass the SEM trigger to reader 610 (Block 606).

In various embodiments, reader 610 of data file composer 602 may trigger a query engine for a first data source type (Block 612). The first data source type may include a big data storage format as described above. The query engine may generate a query to select the preselected columns in the preselected schema from the data sources having the first data source type. Reader 610 may run the query against the extracted data in output 422 of FIG. 2, which may be stored in the use case folder (Block 614). Reader 610 may generate a schema string for the first data source type and register the string in a temporary table (Block 616). Reader 610 in subsequent queries may use the temporary table. The reader 610 may be a spark application and the string may be, for example, an RDD (resilient distributed datasets) string object instantiated from the RDD class or an extension of the RDD class as documented at https://spark.apache.org/docs/1.6.2/api/java/org/apache/spark/rdd/RDD.html, which is incorporated herein by reference.

In various embodiments, reader 610 may generate a query for a second data source type in response to completion of the query for the first data source type (Block 620). Reader 610 may run the second query against the schema string for the first data source type registered in the temporary table and static tables (Block 618). The static tables may contain data and/or metadata that changes infrequently or does not change such as, for example, country code, currency code, or other data that changes infrequently. Reader 610 may generate a schema string for the second data source type and register the string in the temporary table (Block 622). The reader 610 may generate, for example, an RDD string object instantiated from the RDD class in spark, as described above, for the second data storage format.

In various embodiments, reader 610 may generate a query for a third data source type in response to completion of the query for the second data source type (Block 624). The various data source types referred to herein may be, for example, headers, trailers, markets, transaction detail records, transaction summaries, or other data types. Reader 610 may run the third query against the schema string for the first data source type and the second data source type, as registered in the temporary table, as well as a lookup table (626). The lookup table may contain lookup values that changes infrequently or do not change such as, for example, country code lookups, currency code lookups, or other data that changes infrequently. Reader 610 may generate a schema string for the third data source type and register the string in the temporary table (Block 628). Reader 610 generates, for example, an RDD string object instantiated from the RDD class in spark, as described above, for the third data storage format.

In various embodiments, reader 610 may generate a fourth query for a fourth and fifth data source type in response to completion of the query for the third data source type (Block 630). Reader 610 may run the fourth query against the schema string for the first data source type, the second data source type, and the third data source type, as registered in the temporary table, as well as the lookup table (Block 632). Reader 610 may generate a fourth schema string for the fourth and/or fifth data source type and register the strings in the temporary table (Block 634). The strings may be, for example, an RDD string object instantiated from the RDD string class in spark, as described above, for the fourth and/or fifth data storage format.

In various embodiments, reader 610 may continue to query additional data sources until each data source (identified by the user in the preselected schema that is retrievable) has been retrieved by reader 610. Reader 610 may read/write each schema string for each data source type from/to memory 640 during processing. Reader 610 may also return each reader string and/or a reference to each reader string to data file composer 602. Data file composer 602 may invoke writer 650 and pass the schema strings created by reader 610 to writer 650 (Block 637). Writer 650 may be a program written in a language such as, for example, spark or Java and configured for execution by data file composer 602.

In various embodiments, writer 650 may use the schema string to determine which data to retrieve (Block 652). For example, writer 650 may use file composition information from the schema to decide which data to get from the RDD strings. Writer 650 may loop through an RDD handling groupings as they arise (Block 654). A grouping may arise in response to a key field from a first data set mapping to one or more field in a second data set. Writer 650 may join rows of the first data set with rows in the second dataset based on the rows having a matching key field, for example.

In various embodiments, writer 650 may apply attributes from the schema and trigger to format data sources from the RDD (Block 656). Writer 650 may create a formatted and ordered string containing file content for the customized output file to be written to disk (Block 658). Data file composer 602 may initiate a file persister to write the output data file to disk (Block 662). The file persister may be configured to write files for a distributed file system such as the HDFS, as described herein. The file persister may be a function or method that writes a file to the HDFS. The file persister may take one or more strings for file content and/or file destination as input parameters and write a file as an output. The file persister may overwrite existing files at the file destination.

Data file composer 602 may pass to the file persister the string returned by writer 650 (Block 660). A naming module may generate the file name and location to which the output file will be written (Block 664). The data file composer 602 may then write the output file to disk 670 (Block 666).

In various embodiments, system 400 may distribute the output file written to disk 670 to client device 102. System 400 may use a secure file transfer (SFT) channel to communicate with client device 102 configured to receive SFT transfers from application servers 106 and/or data storage system 110 (Block 672). Exemplary secure file transfer systems may run SSH file transfer protocol, secure FTP, SFTP, or other secured file transfer protocols. System 400 may generate and transfer custom generated output file based on the preselected schema identified by a user of a client device 102. A trigger may also be sent as output 528 to message queue 526 of FIG. 5. System 400 may then delete from the trigger table Referring now to FIG. 7, an exemplary process 700 is shown for creating and transferring custom data files from a data storage system 110 running a big data environment to a client device 102, according to various embodiments. System 400 may receive a preselected schema from client device 102 (Step 702). The preselected schema may identify the desired columns from various data sources for inclusion in the customized output data file.

In various embodiments, system 400 may read data from the data sources to generate a data file (Step 704). The data may be stored in a use case folder, as described above, for access by reader 610 and writer 650. System 400 may monitor triggers to detect that the data sources have been updated using SEM 502, as described herein (Step 706).

In various embodiments, system 400 may read data from the data file and filter data from the data file based on the preselected schema using data file composer 602 (Step 708). Data file composer may use reader 610 to read the data file and prepare the data file for writer 650 as described above. Data file composer 602 may also use data writer to write the output file to disk, as described above. System 400 may transfer the completed output data file to client device 102 (Step 710). System 400 may use an SFT to complete the transfer to a client device 102. The output data file may include the columns that identified in the preselected schema from the data sources that include the identified columns.

For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, nonrelational, hierarchical, graphical, or object-oriented structure and/or any other database configurations including various big data products available from the Apache Software Foundation as described above. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.192.225). The web server retrieves the appropriate web pages and sends the data or applications for the web pages to the IP address. Web services are applications that are capable of interacting with other applications over a communications means, such as the interne. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of generating and delivering custom data sets in a data environment, comprising:
receiving a preselected schema that identifies a plurality of columns from a plurality of data sources for inclusion in a customized output data file;
reading data from the plurality of data sources to generate a data file containing a data table by extracting data from a data storage system, staging the data in a staging table, preprocessing the staging table to generate the data file, and storing the data file in a use case folder;
monitoring the plurality of data sources to detect that the plurality of data sources have been ingested into the data storage system by listening to a messaging queue to detect a timestamp of the data file, comparing the timestamp of the data file to a timestamp of a trigger in a trigger table to determine that a data source associated with the trigger has been ingested into the data storage system, and completing a data readiness check to determine that individual ones of the plurality of data sources have been ingested more recently than the timestamp of the data file;
reading the data file and filtering a column from the data file in response to the data readiness check and the preselected schema excluding the column to generate the customized output data file by executing a first query against the data file to generate a first schema and registering the first schema in a temporary table, wherein the customized output data file comprises the plurality of columns from the plurality of data sources; and transferring the customized output data file to a client device.

2. The method of claim 1, wherein the transferring the output data file to the client device comprises transferring the data file over a secure file transfer channel.

3. The method of claim 1, further comprising creating a formatted and ordered string containing content in response to the reading the data file.

4. The method of claim 3, further comprising writing the customized output data file to a distributed file system.

5. A computer-based system, comprising:
a processor;
a tangible, non-transitory memory configured to communicate with the processor, the tangible, non-transitory memory having instructions stored thereon that, in response to execution by the processor, cause the computer-based system to perform operations comprising:
receiving a preselected schema that identifies a plurality of columns from a plurality of data sources for inclusion in a customized output data file;
reading data from the plurality of data sources to generate a data file containing a data table by extracting data from a data storage system, staging the data in a staging table, preprocessing the staging table to generate the data file, and storing the data file in a use case folder;
monitoring the plurality of data sources to detect that the plurality of data sources have been ingested into the data storage system by listening to a messaging queue to detect a timestamp of the data file, comparing the timestamp of the data file to a timestamp of a trigger in a trigger table to determine that a data source associated with the trigger has been ingested into the data storage system, and completing a data readiness check to determine that individual ones of the plurality of data sources have been ingested more recently than the timestamp of the data file;
reading the data file and filtering a column from the data file in response to the data readiness check and the preselected schema excluding the column to generate the customized output data file by executing a first query against the data file to generate a first schema and registering the first schema in a temporary table, wherein the customized output data file comprises the plurality of columns from the plurality of data sources; and
transferring the customized output data file to a client device.

6. The computer-based system of claim 5, wherein the transferring the customized output data file to the client device further comprises transferring the data file over a secure file transfer channel.

7. The computer-based system of claim 5, wherein the reading the data file further comprises:
executing a first query against the data file to generate a first schema; and
registering the first schema in a temporary table.

8. The computer-based system of claim 5, further comprising creating a formatted and ordered string containing content in response to the reading the data file.

9. The computer-based system of claim 5, further comprising writing the customized output data file to a distributed file system.

10. An article of manufacture including a non-transitory, tangible computer readable storage medium having instructions stored thereon that, in response to execution by a computer-based system, cause the computer-based system to perform operations comprising:
receiving, by the computer-based system, a preselected schema that identifies a plurality of columns from a plurality of data sources for inclusion in a customized output data file;
reading, by the computer-based system, data from the plurality of data sources to generate a data file containing a data table by extracting data from a data storage system, staging the data in a staging table, preprocessing the staging table to generate the data file, and storing the data file in a use case folder;
monitoring, by the computer-based system, the plurality of data sources to detect that the plurality of data sources have been ingested into the data storage system by listening to a messaging queue to detect a timestamp of the data file, comparing the timestamp of the data file to a timestamp of a trigger in a trigger table to determine that a data source associated with the trigger has been ingested into the data storage system, and completing a data readiness check to determine that individual ones of the plurality of data sources have been ingested more recently than the timestamp of the data file;
reading the data file and filtering a column from the data file in response to the data readiness check and the preselected schema excluding the column to generate the customized output data file by executing a first query against the data file to generate a first schema and registering the first schema in a temporary table, wherein the customized output data file comprises the plurality of columns from the plurality of data sources; and
transferring, by the computer-based system, the customized output data file to a client device.

11. The method of claim 1, wherein extracting data from the data storage system further comprises extracting the data at predetermined times by creating a schedule of Cron jobs.

12. The computer-based system of claim 5, wherein extracting data from the data storage system further comprises extracting the data at predetermined times by creating a schedule of Cron jobs.

13. The article of claim 10, wherein extracting data from the data storage system further comprises extracting the data at predetermined times by creating a schedule of Cron jobs.

14. The computer-based system of claim 5, further comprising writing the customized output data file to a disk associated with the data storage system.

15. The method of claim 1, further comprising writing the customized output data file to a disk associated with the data storage system.

16. The article of claim 10, further comprising writing the customized output data file to a disk associated with the data storage system.

17. The article of claim 10, wherein the transferring the output data file to the client device comprises transferring the data file over a secure file transfer channel.

18. The article of claim 10, further comprising creating a formatted and ordered string containing content in response to the reading the data file.

19. The article of claim 18, further comprising writing the customized output data file to a distributed file system.

* * * * *